(12) United States Patent
Klingbeil

(10) Patent No.: US 9,284,124 B2
(45) Date of Patent: Mar. 15, 2016

(54) SCRAPER FOR CHAIN SCRAPER CONVEYORS

(71) Applicant: CATERPILLAR GLOBAL MINING EUROPE GMBH, Lünen (DE)

(72) Inventor: Willi Klingbeil, Werne (DE)

(73) Assignee: Caterpillar Global Mining Europe GmbH, Lünen (DE)

( * ) Notice: Subject to any disclaimer, the term of this patent is extended or adjusted under 35 U.S.C. 154(b) by 0 days.

(21) Appl. No.: 14/406,410

(22) PCT Filed: May 23, 2013

(86) PCT No.: PCT/EP2013/001524
§ 371 (c)(1),
(2) Date: Dec. 8, 2014

(87) PCT Pub. No.: WO2013/182275
PCT Pub. Date: Dec. 12, 2013

(65) Prior Publication Data
US 2015/0144464 A1 May 28, 2015

(30) Foreign Application Priority Data
Jun. 8, 2012 (DE) ............. 20 2012 102 111 U

(51) Int. Cl.
*B65G 19/24* (2006.01)
*B65G 19/10* (2006.01)
*B65G 19/22* (2006.01)

(52) U.S. Cl.
CPC ............. *B65G 19/24* (2013.01); *B65G 19/10* (2013.01); *B65G 19/22* (2013.01)

(58) Field of Classification Search
CPC ........ B65G 19/00; B65G 19/20; B65G 19/24; B65G 19/245
USPC .................................... 198/728, 731
See application file for complete search history.

(56) References Cited

U.S. PATENT DOCUMENTS

| 4,265,359 | A  | * | 5/1981  | Temme ............... 198/731 |
| 6,595,351 | B2 | * | 7/2003  | Malitzki .............. 198/731 |
| 7,775,342 | B2 | * | 8/2010  | Merten et al. ......... 198/731 |
| 8,662,287 | B2 | * | 3/2014  | Fischer et al. ........ 198/731 |
| 2005/0284733 | A1 | * | 12/2005 | Malitzki et al. ...... 198/729 |

(Continued)

FOREIGN PATENT DOCUMENTS

| CN | 101223091 | 7/2008 |
| CN | 101362552 | 2/2009 |

(Continued)

OTHER PUBLICATIONS

International Search Report dated Oct. 1, 2013 from Application No. PCT/EP2013/001524; filed May 23, 2013.

*Primary Examiner* — James R Bidwell

(57) ABSTRACT

The present disclosure relates to a scraper for chain scraper conveyors, particularly twin chain scraper conveyors. The scraper may comprise a one-piece scraper bridge including two side scraper wings connected by a head web, a retaining bracket insertable from an underneath side of the scraper bridge into an insert recess, and a locking device. The retaining bracket may be insertable for detachably locking the scraper on a chain link of a scraper chain. The retaining bracket may engage with grooves on either side of the insert recess in an assembled state. The scraper may further include a locking device for securing the assembly state of the retaining bracket in the insert recess, wherein the retaining bracket may be displaceable in the associated insert recess parallel to the head web on one of the scraper wings into a locking position and having at least one retaining cam.

20 Claims, 3 Drawing Sheets

(56) References Cited

U.S. PATENT DOCUMENTS

2009/0266681 A1* 10/2009 Merten et al. ............... 198/731
2011/0315519 A1* 12/2011 Fischer et al. ............... 198/728

FOREIGN PATENT DOCUMENTS

| | | |
|---|---|---|
| CN | 102300789 | 12/2011 |
| DE | 3907639 A1 | 9/1990 |
| DE | 19511043 C1 | 4/1996 |
| DE | 10147846 A1 | 4/2003 |
| DE | 20300239 U1 | 4/2003 |
| DE | 10225341 C1 | 10/2003 |
| EP | 1999044 B1 | 6/2010 |

* cited by examiner

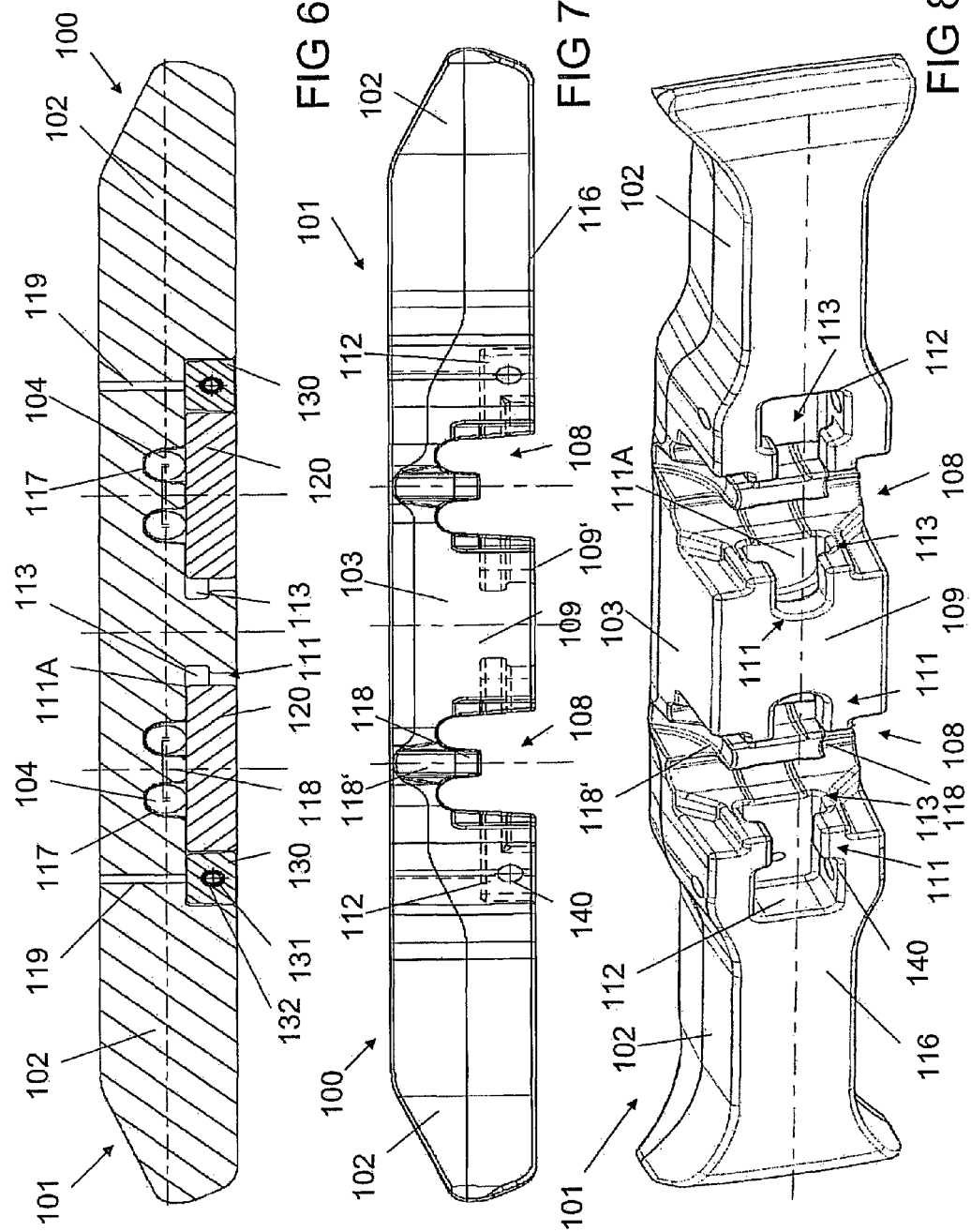

SCRAPER FOR CHAIN SCRAPER CONVEYORS

CROSS-REFERENCE TO RELATED APPLICATIONS

This application is a National Stage of International Patent Application No. PCT/EP2013/001524, filed May 23, 2013, which claims priority to foreign German Patent Application No. 20 2012 102 111.0, filed Jun. 8, 2012, the contents of which are incorporated herein by reference in their entirety.

TECHNICAL FIELD

The present disclosure relates to scrapers for chain scraper conveyors, more particularly for twin scraper chain conveyors, and to a scraper bridge for such a scraper.

BACKGROUND

Scrapers of generic kind for chain belts of twin inboard chain scraper conveyors are used particularly in underground mining operations and are subjected to high mechanical stress, since they have to convey the entire highly abrasive conveyor material in the conveying belt side of the scraper chain conveyor.

For example, DE 102 25 341 C1 discloses a scraper fixed on chain links of scraper chains whose horizontal and vertical chain links each consist of oval ring eyelet members with round chain bow ends. Fixing the scraper on the horizontal chain links of these link chains is carried out by means of a retaining or securing bracket which runs in one piece between the two insides of the scraper wings of the scraper bridge, clamps the horizontal chain links from below against the underneath of the head web of the scraper bridge and fits laterally by its bracket ends in grooves on the insides of the scraper wings. Mounting the retaining bracket is undertaken by vertically sliding in from underneath, and securing the bracket on the head web against release is carried out by means of spring pins which can be inserted in through bores, engage through the pivots which are formed integral on the upper side of the bracket and engage in corresponding bolt recesses in the head web.

From DE 195 11 043 C1 it is known that the horizontal chain links clamped on the scraper are exposed to increased wear if they are not clamped sufficiently firmly and permanently between the bracket and the scraper body. In order to counteract any loosening of the chain links on the scraper body during the moving conveyor operation, the chain brackets and the underneath of the scraper body are curved convex relative to the longitudinal axis of the scraper in order during assembly to exert a defined assembly force on the inner and outer arms of the chain links. This assembly force is introduced into the bracket via nuts and threaded bolts. The threaded bolts are formed integral on the upper side of the chain bracket and engage through bores in the scraper body. The nuts which are countersunk in large surface area sockets on the top side of the scraper body are screwed up tight by generating the assembly and clamping force thereon.

During operation of the scrapers with screw connections between the retaining brackets and scraper body, cracks appear in part in the scraper body particularly in the area of the recesses particularly when they are used in high performance conveyors. The cause of this is inter alia also the reduction in the cross-sectional size of the head web of the scraper bridge as a result of the recesses for the nuts. With the scraper known from DE 102 25 341 C1 this is indeed avoided by the comparatively strong pivots, but storing these retaining brackets as spare parts is however made difficult by the pivots, the material and manufacturing costs for both the brackets and the scraper bridge are high and in order to dismantle the retaining bracket it is necessary in order to prevent canting to act on the two pivots as far as possible simultaneously e.g. with a hammer tool.

The present disclosure is directed, at least in part, to improving or overcoming one or more aspects of prior systems.

SUMMARY OF THE DISCLOSURE

According to an aspect of the present disclosure, a scraper for chain scraper conveyors, more particularly twin chain scraper conveyors, may comprise a one-piece scraper bridge including two side scraper wings connected by a head web. The scraper bridge may further include a retaining bracket being insertable from an underneath side of the scraper bridge into an insert recess for detachably locking the scraper on a chain link of a scraper chain, and form-fittingly engaging with grooves on either side of the insert recess in an assembled state. The grooves may be opened towards the underneath side of the scraper bridge. The scraper bridge may further include a locking device for securing the assembly state of the retaining bracket in the insert recess. The retaining bracket may be displaceable in the associated insert recess parallel to the head web on one of the scraper wings into a locking position and having at least one retaining cam, which in the locking position engages in a groove section formed with an under-cut section of the groove.

According to another aspect of the present disclosure, a scraper bridge for a scraper of a chain scraper conveyor, particularly for a scraper according to the present disclosure, may comprise two lateral wings, a head web connecting the lateral wings, an insert recess formed underneath the head web for a retaining bracket which can be inserted from an underneath side of the scraper bridge for detachably locking the scraper on a chain link of a scraper chain, and grooves opening to the underneath side of the scraper bridge on each side of the insert recess for supporting the retaining bracket with positive locking engagement. The grooves may have a groove section formed with an under-cut section into which a retaining cam on the retaining bracket can be pushed by a transverse displacement.

According to another aspect of the present disclosure, a retaining bracket for a scraper of a chain scraper conveyor, particularly for a scraper according to the present disclosure, may comprise a bracket body insertable into an insert recess on a scraper bridge. The bracket body may be formed underneath a head web of the scraper bridge and having grooves opening towards the underneath of the scraper bridge on each side of the insert recess for supporting the retaining bracket with positive locking engagement. The bracket body may be provided integral with at least two retaining cams spaced from one another for engaging behind groove sections formed with under-cut section in the grooves in the scraper body.

Other features and aspects of this disclosure will be apparent from the following description and the accompanying drawings.

BRIEF DESCRIPTION OF THE DRAWINGS

FIG. 6 shows a scraper according to a second embodiment in a longitudinal sectional view;

FIG. 7 shows the scraper bridge of the scraper according to FIG. 6 in side view with the insert recess indicted in dotted lines;

FIG. 8 shows the scraper bridge of the scraper according to FIG. 6 in a perspective view onto the underneath with the separate insert recesses;

DETAILED DESCRIPTION

Figure 1:
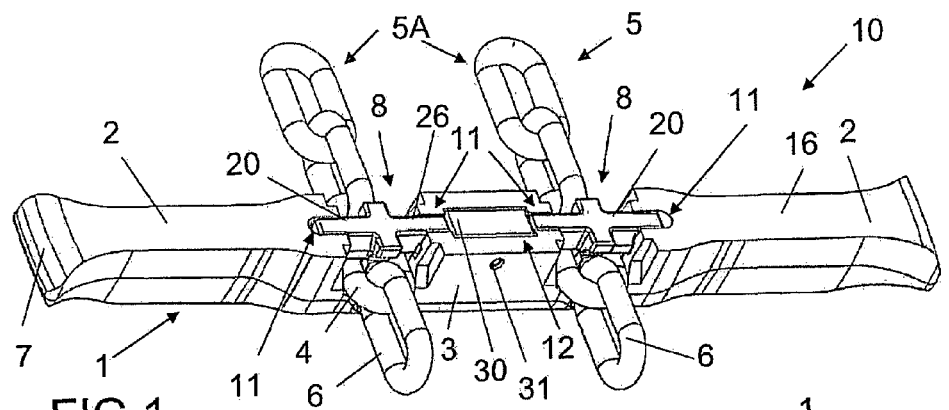
FIG. 1 shows a perspective view of a scraper according to a first embodiment with an inserted chain section, a fitted retaining bracket and inserted filler member looking onto the underneath of the scraper.
Figure 2:
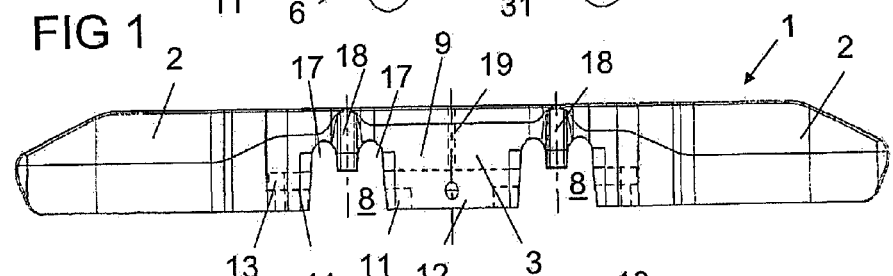
FIG. 2 shows a side view of the scraper bridge of FIG. 1 with an insert recess shown in dotted lines.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

In FIG. 1 a scraper according to a first embodiment of the present disclosure is denoted by the reference numeral 10 and is designed for connecting to the two chain strings running parallel to one another of a twin inboard chain of a twin inboard chain scraper conveyor. The scraper 10 consists of a strong scraper bridge 1, preferably made as a cast or forged part, which has at each of its two opposite ends a scraper wing 2 which are connected to one another by a head web 3 as the center part of the scraper bridge 1.

In the illustration of FIG. 1, the scraper 10 is shown looking onto the underneath of the scraper bridge 1, although when in operation the surface which lies at the top in FIG. 1 actually forms the underneath 16 of the scraper wings 2 or the scraper bridge 1. The scraper 10 may glide in the conveying belt side of a chain scraper conveyor, also known as an armored face conveyor, over its conveyor base, in order with its end side lying at the front in the running direction to push forward the material such as, for example, coal which is to be conveyed.

In a chain scraper conveyor (not shown) corresponding scrapers 10 come into use at intervals of mostly about 0.8 m-2 m and are for this detachably attached to the horizontal chain links 4 of the individual chain strands 5A of the scraper chain 5. As a horizontal guide, the scrapers 10 engage using the outer profiled end zones 7 of the scraper wings 2 into correspondingly profiled side profiles in the conveying strand or return strand of the scraper chain conveyor and the scraper wings 2 widen out towards the end zones 7 in order to obtain an improved conveying behaviour for the material to be conveyed in the conveying strand.

The connection of the scraper bridge 1 of the scraper 10 to the chain strands 5A of the twin chain 5 takes place in the first embodiment through two spaced insert recesses 8 which are open to the underneath 16 of the scraper bridge 1 and are here separated from one another by an intermediate web 9. Each horizontal chain link 4 of each chain strand 5A is inserted in an associated insert recess 8 in order to achieve the connection between the twin chain 5 on the one hand and the scraper 10 on the other.

For each insert recess 8 there is in the case of the scraper 10 according to FIG. 1 a separate retaining bracket 20 which can be inserted from underneath 3 into the insert recess 8. FIG. 1 shows the assembly states in which the two retaining brackets 20 are located in a locking position. In this locking position the horizontal chain link 4 is locked or clamped in the relevant insert recess 8 between the underneath of the head web 3 on the one hand and the upper side of the relevant retaining bracket 20 on the other.

As can be clearly seen from FIG. 1, each retaining bracket 20 engages in a groove 11 which extends out from the underneath 16 of the scraper bridge 1 to the top web 3. The retaining bracket 20 is enclosed in the running direction of the scraper 10 in part by wall parts of the scraper bridge 1. With the scraper 10 according to the present disclosure, the retaining brackets 20 can however not be pushed by a purely vertical movement into the grooves 11 in order to reach the locked position shown in FIG. 1. Rather the fitting of each retaining bracket 20 in the associated groove 11 of the relevant insert recess 8 is carried out by a combined movement, namely a lowering movement into the groove and then a transverse displacement of each retaining bracket 20 in the associated groove 11 onto the adjoining scraper wing 2.

An assembly and dismantling of the retaining brackets 20 in the case of the scraper according to FIG. 1 is only possible when the filler member 30 located between the two retaining brackets 20 is dismantled and a groove extension 12, which here connects the two grooves 11 together and forms an assembly opening for the retaining brackets 20 and is closed by means of the filler member for the operating use, is open. With the first embodiment the groove extension 12 which is arranged in the centre web 9 connects the relevant grooves 11 of the associated two separate insert recesses 8 for the two separate but identically designed retaining brackets 20.

Figure 5:
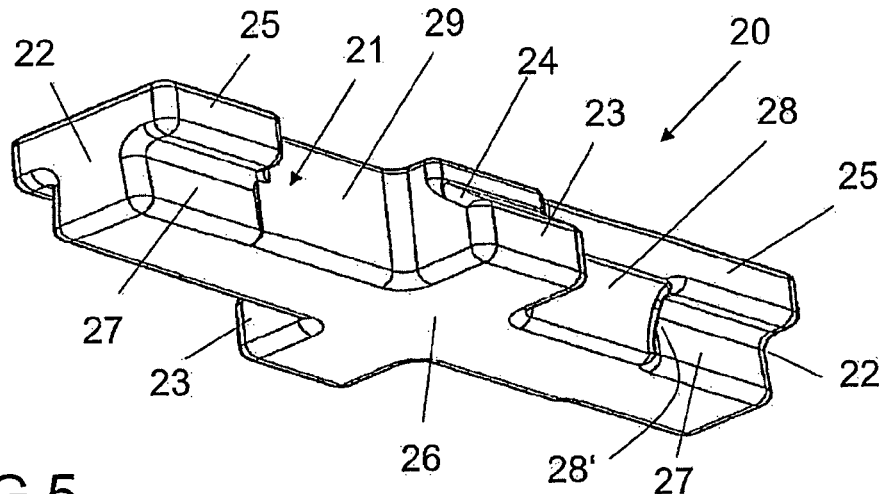
FIG. 5 shows a perspective view of the retaining bracket used in the scraper according to FIG. 1.

FIG. 5 shows a retaining bracket 20 in detail, wherein special features of the retaining bracket 20 are first explained. The retaining bracket 20 has a relatively elongated bracket body 21 whose base surface forms a cross with two long arms and two short arms. The short arms are arranged centrally between the two bracket ends 22 of the long arms of the bracket body and project as bearing noses 23 for the chain links of a chain strand sideways over the end sides of the bracket body 21.

In order to form functional bearing noses 23, the front sides of the short arms are provided in part with a curvature or a curved bearing surface 24 which can be adjoined in the assembly state of a scraper on a scraper chain, as shown in FIG. 1, by the bow ends of the vertical chain links 6 which lie adjoining the scraper. The bracket body 21 of the retaining bracket 20 has zones of different width. The width in the area of the bracket webs 27 underneath the retaining cams 25 and in the intermediate section 29 in which the positioning web is not formed, is hereby the same. The bracket body 20 has the maximum width in the area of the bearing noses 23 and the curved bearing faces 24. The width measurement of the retaining bracket 20 in the area of the bearing noses 23 is hereby preferably smaller than the width of the scraper bridge in the area of the head web 3.

A special feature of the retaining bracket 20 consists in the fact that this is provided, in the illustrated embodiment each directly adjoining the bracket body ends 22, with retaining cams 25 which project on both sides beyond the end faces of the bracket body 21, wherein the bracket body 21 has a T-shaped cross-section in the area of the retaining cams 25 and the retaining cam 25 extends roughly only over half the height of each retaining bracket 20. As a result of this special configuration of the retaining bracket with in this case several retaining cams, a transverse displacement of the retaining bracket 20 inside the insert recess 8 is required for the assembly and locking of the retaining bracket 20 in the insert recess on the scraper bridge. The retaining cams 25 each lie spaced from the flat underneath 26 of the bracket body 21. In the assembly state of the retaining bracket 20 however the retaining cams 25 each engage behind a groove section 13 of the groove 11 formed with an under-cut section either side of the insert recess.

Figure 4:
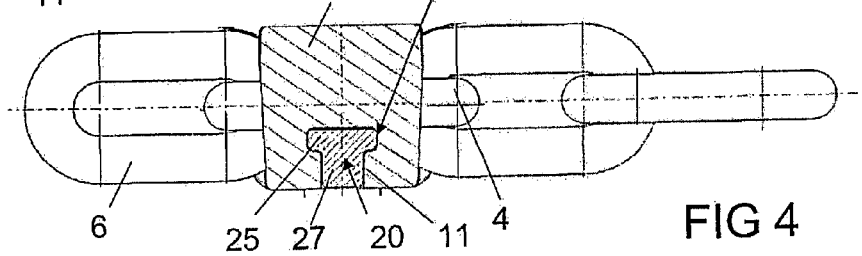
FIG. 4 shows a vertical section through the scraper wing of the scraper according to FIG. 1 in the area of the under-cut groove and the retaining cam on the retaining bracket.

This is particularly easy to see in FIG. 4 which shows a vertical section through a scraper 10 parallel to the running direction of the scraper. A widened under-cut groove section 13 of the groove 11 is located on either side of an insert recess. As a result of the positive-locking engagement of the retaining cams 25 in these under-cut groove sections 13, as shown in FIG. 4, the retaining bracket 20 is held in its locking position in the vertical direction in the insert recess. Each retaining cam 25 forms an under-cut anchor for fixing the retaining bracket 20 in the groove 11. The retaining cam 25 only comes free from the under-cut groove section 13 through a transverse displacement of the retaining bracket 20 inside the insert recess 8.

Figure 3:
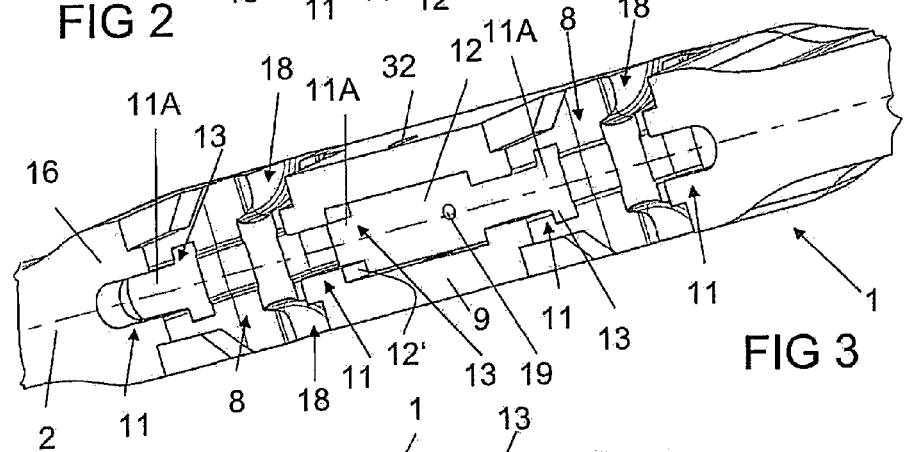
FIG. 3 shows a perspective view of the scraper bridge of FIG. 1 looking onto the insert recesses.

The structural design and shaping of the insert recess 8 as well as the associated grooves 11 can be seen particularly clearly from the perspective view onto the underneath of the scraper wing 1 in FIG. 3. Each insert recess 8 comprises a groove 11 located on the inside of a scraper wing 2, and a groove 11 located in the centre web 9. Each groove 11 has on the base 16 of the scraper wing 1 a narrower opening cross-section than close to the bottom 11A of the groove. This rectangular groove extension designed as an under-cut section and preferably milled with a groove cutter provides for an under-cut groove section 13 of the grooves 11 in the area of the centre web 9 as well as in the area of the scraper wing 2.

The groove extension directly adjoins the groove bottom 11A of the groove 11. Matching the T-shaped or rectangular geometrical shape of the retaining cams 25 on the retaining brackets 20, the groove sections 13 which provide for the under-cut section also have a T-shaped or rectangular cross-section over the entire groove length up to each relevant side outer groove end, so that the retaining cams can be pushed correspondingly far into the under-cut groove sections 13 until the relevant inner lying bracket end of a retaining bracket then lies flush with the side borders 12' of the groove extension 12 in the centre web 9. The terms outside and inside refer here to the longitudinal extension of the scraper bridge on which the scraper wings are arranged on the outside and the centre web lies on the inside.

The internal width of the groove 11 close to the groove bottom 11A, thus in the area of the widened groove sections 13 providing for the under-cut section, must be greater than the width of the retaining bracket between the end sides of the retaining cams 25 (FIG. 3). The same applies for the width of the groove extension 12 in the centre web 9. The groove 11 has in the area of the widened groove section 13 providing for the under-cut section substantially the same width as the groove extension 12 in the centre web 9.

In order to fit a retaining bracket 20, it must be fitted, when the filler member 30 is dismantled, from below against the scraper bridge 1 so that the one pair of retaining cams 25 at one end 22 of the retaining bracket 20 is located inside the groove extension 12 which forms the "assembly opening", whilst the other pair of retaining cams 25 is located inside the actual insert recess 8 between the grooves.

In this insert position, which is not shown for the first embodiment according to FIGS. 1 to 5, namely only in this position, the retaining bracket 20 can then be lowered vertically downwards down to the groove bottom 11A of the grooves 11 until its underneath 26 lies flush with the underneath 16 of the scraper 1. Only then can the transverse displacement of the retaining bracket up to the adjoining scraper wing 2 take place wherein this transverse displacement takes place parallel to the longitudinal extension of the scraper bridge 1, and correspondingly transversely to the running direction of the scraper chain 5 or scraper 1 in the operating use of a chain scraper conveyor. During the transverse displacement the retaining cams 25 lying at the front then engage in the relevant widened groove section 13 of the groove 11 in the area of the scraper wing 2 and the correspondingly rear or inwardly lying retaining cams 25 engage in the under-cut or widened section 13 of the groove 11 in the area of the centre web 9 of the scraper bridge 1, whereby a retaining bracket 20 is secured in the vertical direction through the interaction of the under-cut groove sections 13 and the retaining cams 25 and is also at the same time secured with positive locking parallel to the conveyor direction, since the bracket body 21 of the retaining bracket 20 engages with the relevant bracket web 27 underneath the retaining cam 25 into the narrower area of the groove 11.

After a first retaining bracket 20 is placed in the aforesaid way against the groove extension 12 and shifted into its locking position, as shown in FIG. 1, the second retaining bracket 20 can then be mounted accordingly. For this the second retaining bracket with the filler member 30 removed is brought into an assembly position in which the one inner retaining cams 25 are located in the area of the groove extension 12 and the other outer retaining cams 25 are located in the area of the insert recess 8. In this position first the lowering takes place downwards to the groove bottom (11A, FIG. 3) and then, opposite to the transverse movement of the first retaining bracket 20, a transverse displacement takes place of the second retaining bracket 20 to the other scraper wing 2, so that then the two retaining brackets 20 reach the locking position illustrated in FIG. 1.

As soon as the two retaining brackets 20 are pushed into their locking position, the filler member 30, which can consist of a rectangular block, is pushed in a vertical movement into the groove extension 12 and is then secured against falling out from the groove extension 12 by means of, for example, a spring pin 31. Each retaining bracket 20 hereby engages on either side of the insert recess 8 with positive connection in a section of the groove 11 and is secured against falling out on either side of the insert recess 8 via an under-cut section. Again, during operation, no noticeable forces act on the filler member 30.

All the forces in the direction of movement are rather introduced into the retaining bracket 20 from the vertical chain links 6 on the one side via the bearing noses 23 and are introduced via the retaining cams 25 and in particular the bracket webs 27 into the scraper body 2, and on the other side are also introduced directly into the scraper bridge 1. As shown clearly in FIGS. 2 and 3, each insert recess 8 has chain link beds 17 formed on the underneath of the head web 3 for the longitudinal arms of the horizontal chain links.

In order to improve the force transfer, a bearing nose 18 which projects slightly over the end sides of the head web 3 is formed between the chain link beds 17, and the upper area of the bow ends of the vertical chain links (6, FIG. 1) can bear against the nose. In the assembled state of a retaining bracket 20 on the scraper bridge 1 the curvatures 24 of the bearing noses 23 on the retaining brackets 20 lie directly underneath the likewise arcuate curved bearing noses 18 of the scraper bridge 1, wherein the bearing nose 18 fits likewise in the eyelet-type centre opening of the horizontal chain link 4 which is enclosed loose in the insert recess 8.

The retaining bracket 20 according to FIGS. 1 and 5 has additionally still between the right-hand side pair in FIG. 5 of retaining cams 25 and the centrally positioned bearing noses 23 on either side, a positioning web 28 which is formed integral on the bracket body 21. The positioning web 28 defines the displacement path of each retaining bracket 20 to the outside, since the head face 28' of the positioning web 28 projects slightly beyond the web section 27 underneath the retaining cams 25.

The retaining bracket 20 according to FIG. 5 can therefore fit on each insert recess 8 only in a predominant direction, for the positioning web 28 must during assembly of the retaining bracket 20 lie inside the insert recess 8 underneath the chain link beds 17 and between the grooves 11, whilst the retaining cams 25 are inserted at the opposite bracket end 22 into the groove extension 12. Tolerances of the groove 11 and the dimensions of the insert recess 8 can be compensated via the positioning web 28, since the distance between the top side 28' of the positioning web 28 and the bracket end 22, on the left in FIG. 5, can be determined relatively exactly.

In order to facilitate dismantling of the filler member 30 after removing the tension sleeve 31, the head web 3 is provided from its upper side with a dismantling groove 19 opening into the groove extension 12 and into which a mandrel or the like can be driven to drive out the filler member.

FIGS. 6 to 9 show a second embodiment of a scraper 100 according to the present disclosure as well as an associated retaining bracket 120. As with the previous embodiment the scraper 100 consists mainly of a strong forged or cast scraper bridge 101 with lateral scraper wings 102 formed integrally on a centre head web 103 wherein excavated material is moved inside the conveyor channel of a chain scraper conveyor with the end sides of the scraper wings 102 and the end side of the head web 103. As with the previous embodiment, also here two separate insert recesses 108 are formed underneath the scraper bridge 101 each for receiving a separate retaining bracket 120, as shown in FIG. 6.

As with the previous embodiment, a centre web 109 is located between the insides of the scraper wings 102, with the underneath side 109' of the centre web aligned flush with the underneath side 116 on the scraper wings 102 and thus the underneath side of the scraper bridge 101. FIG. 6 shows the retaining bracket 120 in the locking position in which the arms of the horizontal chain links 104 are gripped by the upper side of the retaining bracket 120 and are in this way secured completely inside the arm beds 117 against falling down and out.

Also here a downwardly projecting bearing web 118 extends on the scraper bridge 101 between the arm beds 117, the two end sides of the bearing web being provided with bearing recesses 118' for the bow ends of the vertical chain links. In the assembly state, the bearing web 118 engages in the eyelet opening of the horizontal chain links. On each side of each insert recess 108 there is a groove 111 which is formed open to the underneath 116 and in particular FIG. 8 shows clearly that each groove 111 adjoining the groove bottom 111A has a T-shaped groove section 113 which provides for an under-cut section and which serves for the positive locking engagement of the retaining bracket 120 in the locking position.

Deviating from the previous embodiment, here the grooves 111 for the left insert recess 108 and the grooves 111 for the right insert recess 108 are not connected to one another, but each groove 111 is assigned a separate groove extension 112 as the assembly opening for the retaining bracket 120. The groove extension 112 each time adjoins the extended groove section 113 of that groove 111 which is formed on the insides of the scraper wings 102.

Figure 9:
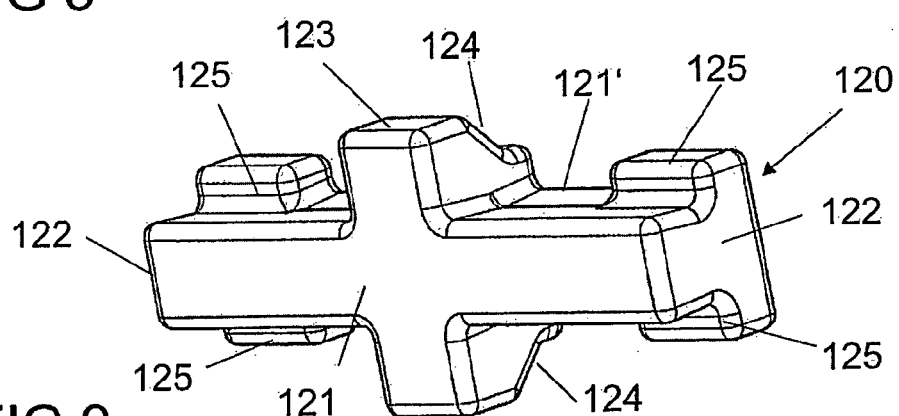
FIG. 9 shows a retaining bracket according to a second embodiment for the scraper according to FIGS. 1 to 6 in a perspective view.

The width of the groove extension 112 is adapted so that the retaining bracket 120 shown in detail in FIG. 9, and which here has two planes of symmetry, namely on the one hand along the elongated bracket body 121 and furthermore centrally between the two bracket ends 122, with the retaining cams 125 formed adjoining the bracket ends 122 and which project each side over the narrow and substantially bar-shaped central bracket body 121, can be lowered over the bracket extension 112 on one side and the insert recess 108 on the other side in the groove before the retaining bracket 120 is displaced by transverse displacement into its locking position in which the retaining cams on the retaining bracket 120 engage behind the grooves 111.

Also here the retaining bracket 120 must for assembly first be placed against the insert recesses 108 so that the one pair of retaining cams 125 is inserted in the groove extension 112 and the other pair of retaining cams 125 is located at the other bracket end 122 inside the insert recess 108. Only in this assembly position, the bracket may be moved downwards until its upper side 121', which in FIG. 9 forms the rear side, bears against the groove bottom 111A of the relevant groove 111. Each retaining bracket 120 is then moved from this position through a transverse displacement into its locking position, as shown in FIG. 6, wherein through the transverse displacement the retaining cams 125 are each pushed into the under-cut groove sections 113 and hereby lock the retaining bracket 120 with positive engagement in the vertical direction.

Since the groove extension 112 is located laterally on the outside in relation to the associated insert recess 108, the displacement movement in the case of the scraper 100 takes place up to the centre web 109 and as soon as the locking position of the retaining bracket 120 is reached, a filler member 130 is pushed in from below into the groove extension 112, thereby preventing as a result of its geometrical shape a return displacement of the retaining bracket 120.

Since the filler member 130 is again not subjected to any stress or load, a simple spring pin 131 which engages through a central bore 132 in the filler member 130 as well as through mutually aligned bores 140 in the side walls defining the groove extension 112, is thereby sufficient for securely locking the filler member. To dismantle each filler member 130, the scraper bridge 101 is provided for each groove extension 112 with a separate dismantling bore 119 into which a dismantling mandrel or the like can be driven from the top side of the scraper bridge 101 in order to knock down and out the filler member 130 when the spring pin 131 is dismantled.

The retaining bracket 120 also has centrally between the pairs of retaining cams 125 a transverse web 123 which projects either side beyond the bracket body 121 and is provided on its upper side with curved bearing noses 124 for the bow ends of the vertical chain links. In the locking position the transverse webs 123 with the bearing noses 124 on the retaining bracket 120 lie directly opposite the bearing webs 118 with the bearing recesses 118' on the underneath of the scraper bridge 101.

The retaining bracket 120 shown in FIG. 9 has no predominant direction and no positioning stop. The retaining bracket 120 can hereby have a slightly larger play than the retaining bracket with the positioning stop as with the previous embodiment. The retaining bracket 120 illustrated in FIG. 9 may however also be used in the case of the embodiment of a scraper according to FIGS. 1 to 4, or the retaining bracket according to FIG. 5 may also be used in the case of the embodiment of a scraper bridge according to FIGS. 6 to 8.

Figure 10:
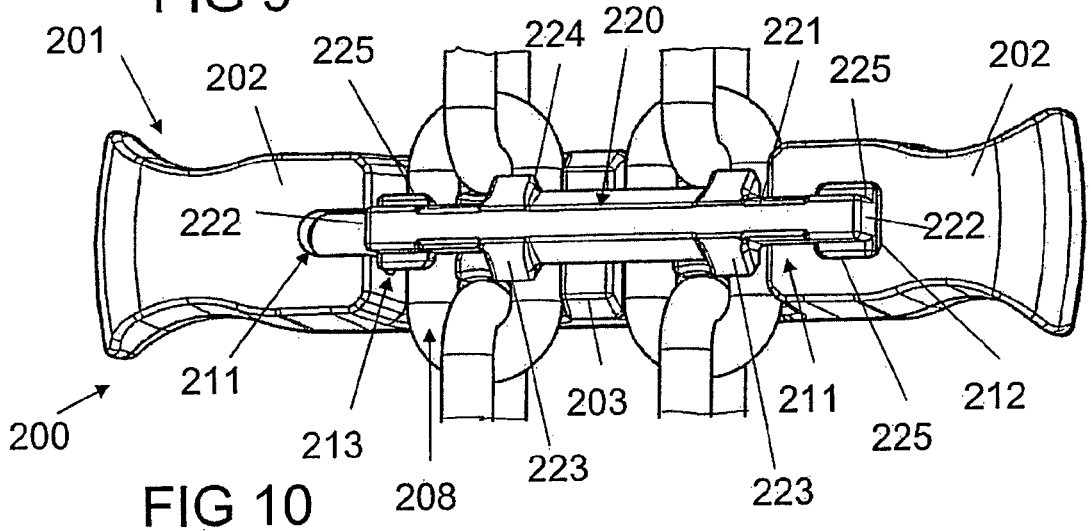
FIG. 10 shows a scraper according to a third embodiment in a perspective view onto the underneath of the scraper.

FIG. 10 shows a third embodiment of a scraper 200 according to the invention for mounting on horizontal chain links of a twin chain of a chain scraper conveyor. Also here the one-piece scraper bridge 201 has two lateral scraper wings 202 which are connected to one another by way of a head web 203. Between the insides of the scraper wings 202 there is however only one single insert recess 208 for holding a single retaining bracket 220 whose length is suitably adapted to be able to engage underneath the entire width span of the insert recess 208 and to be able to engage by its one bracket end 222 in a groove 211 in the one scraper wing 202 and by its other bracket end 222 in a groove 211 on the inside of the opposite scraper wing 202.

The retaining bracket 220 has in turn adjoining the bracket ends 222 retaining cams 225 protruding on each side whereby the relevant bracket ends 222 have a T-shaped cross-section extending over a sufficient partial length.

Each groove 211 has, as with the previous embodiments, one downwardly off-set widened groove section 213 which provides for an under-cut section of the groove 211 on the insides of the scraper wings 202 and into which the retaining cams 225 engage in the locking position of the retaining bracket 220. FIG. 10 shows however not the locking position but the assembly position of the retaining bracket 220, for in this position the retaining cams 225 at the right bracket end 222 of the retaining bracket 220 engage in a groove extension 212 formed on the underneath side of the right scraper wing 202, whilst the other retaining cams 225 as a result of the assembly position are located in the insert recess 208.

As soon as the retaining bracket 220 is introduced into the groove extension 211 or the insert recess 208 down to the groove bottom, the retaining bracket 220 may be moved transversely so that the retaining cams 225 engage in the under-groove sections 213 of the grooves 211 and secure the retaining bracket firmly in the vertical direction. It is then only necessary, as with the previous embodiments to insert a filler member (not shown) into the groove extension 212 which then prevents a transverse movement of the retaining bracket 220 and need then only be secured against falling out of the groove extension.

As with the previous embodiments, bearing noses 224 are also provided in this case on the retaining bracket 220 for the bow ends of the vertical chain links wherein in this case however the single retaining bracket 220 is provided on its bracket body 221 with two transverse webs 223 which are spaced from one another corresponding to the spacing between the chain strands, and which have the bearing noses 224 formed on their upper sides. In the illustrated embodiment, the bracket body 221 of the retaining bracket 220 has between each retaining cam 225 and the transverse webs 223 the narrowest cross-section whose width corresponds substantially to the groove width of the groove 211 underneath the groove sections 213 provided with an under-cut section, for this narrow section at least on one side of the bracket body is required so that the bracket end 222, on the right in FIG. 10, may be lowered at the groove extension 212.

In the illustrated embodiment the bracket body 220 is again symmetrical. It may however also be provided on one of the intermediate sections between the transverse webs 223 and the retaining cams 225 with a positioning stop, similar to that in the embodiment according to FIG. 5, in order to obtain a definite locking position of the retaining bracket 20 and to minimize the movement play of the retaining bracket 220 when the filler member is inserted.

For the expert numerous modifications are apparent from the preceding description which are to fall within the protective field of the dependent claims. It is evident that the retaining cams and the bracket body can also have different cross-sectional geometrical shapes by means of which the bracket body located in the locking position is secured against vertical movements and against falling out from the insert recess. Furthermore the locking of the retaining bracket may also take place without a filler member and instead of this with spring pins or retaining means which either lie adjoining one of the bracket ends or however engage directly through a bore in the bracket body. The geometrical shape and formation of the scraper wings may vary since in particular this geometrical shape is as a rule adapted to the geometrical shape of the guide profiles of the chain scraper conveyor.

INDUSTRIAL APPLICABILITY

The exemplary disclosed scraper, scraper bridge, and retaining bracket are used in underground mining applications, and in connection with a chain scraper conveyor, particularly with a twin chain scraper conveyor.

Although the preferred embodiments of this invention have been described herein, improvements and modifications may be incorporated without departing from the scope of the following claims.

The invention claimed is:

1. A scraper for a chain scraper conveyor, comprising:
a one-piece scraper bridge including two side scraper wings connected by a head web;
a retaining bracket being insertable from an underneath side of the scraper bridge into an insert recess for detachably locking the scraper on a chain link of a scraper chain, and engaging in an assembled state with grooves on either side of the insert recess in a positive-locking manner, the grooves being opened towards the underneath side of the scraper bridge; and
a locking device for securing an assembly state of the retaining bracket in the insert recess,
the retaining bracket being displaceable in the insert recess parallel to the head web on one of the scraper wings into a locking position and having at least one retaining cam, which in the locking position engages an under-cut section of an associated groove.

2. The scraper of claim 1, wherein the retaining bracket includes a bracket body including at least two retaining cams spaced from one another, and wherein a groove on each side of the insert recess is formed with an under-cut section.

3. The scraper of claim 1, wherein the retaining bracket has a T-shaped cross-section in the area of the at least one retaining cam and the under-cut section.

4. The scraper of claim 1, wherein the locking device comprises a filler member which can be pushed from below the scraper bridge into a partial area of the insert recess or the grooves, and which in the assembly state prevents movement of the retaining bracket out of the locking position.

5. The scraper of claim 4, wherein the filler member can be secured in the insert recess by a removable securing element which engages through the filler member and the scraper bridge.

6. The scraper of claim 1, wherein the associated groove is provided on one side of the insert recess with a groove extension as an insert opening for the at least one retaining cam on the retaining bracket, wherein a groove width of the groove extension is greater than a width of the retaining bracket in the region of the at least one retaining cam.

7. The scraper of claim 4, wherein the filler member for securing the locking position of the retaining bracket is or can be inserted into the groove extension.

8. The scraper of claim 1, wherein the insert recess is formed underneath the head web,
wherein the grooves open to the underneath of the scraper bridge on each side of the insert recess for supporting the retaining bracket with positive locking engagement, and
wherein each of the grooves has an under-cut section into which a corresponding retaining cam on the retaining bracket can be pushed by a transverse displacement.

9. The scraper of claim 1, wherein the scraper bridge is provided with a dismantling bore for the filler member, the dismantling bore opening from a top side of the scraper bridge out into the groove extension.

10. The scraper or the scraper bridge of claim 1, wherein
the underneath of the head web is provided with chain link beds for receiving arms of a horizontal chain link,
both end sides of the head web are provided with bearing recesses for bow ends of vertical chain links, and
the retaining bracket has a substantially flat upper side without chain link beds and/or is provided on the end sides with projecting curved bearing faces for the bow ends of the vertical chain links.

11. The scraper or the scraper bridge for a chain scraper conveyor of claim 1, wherein
the chain scraper conveyor is a twin chain scraper conveyor including twin chains,
the insert recess is formed underneath the head web, the insert recess extending between the two side scraper wings to receive a single retaining bracket for chain links of two chains of the twin chains, and
the under-cut section being formed inside the scraper wings.

12. The scraper or the scraper bridge for a chain scraper conveyor of claim 1, wherein
the chain scraper conveyor is a twin chain scraper conveyor including twin chains,
underneath the head web for each chain of the twin chains is a separate insert recess formed for receiving a separate retaining bracket for a chain link of a relevant chain, and
on the underneath of the head web is an intermediate web which is formed extending up to a level of the underneath of the scraper wings and defining at the sides together with an inside of one of the scraper wings the associated insert recess and being provided with an under-cut section.

13. The scraper or the scraper bridge of claim 12, wherein the retaining brackets can each be displaced up to the associated scraper wings of the insert recess into their locking position, and
wherein the locking device comprises a filler member which can be pushed from below the scraper bridge into a connecting groove with a groove extension connecting the two insert recesses and which in the assembly state prevents the two retaining brackets from moving out of the locking position.

14. The scraper of claim 12, wherein the insert recesses are separated from one another and are provided with separate groove extensions for inserting the retaining cam of the associated retaining bracket and for receiving a separate filler member of the locking device.

15. The scraper of claim 13, wherein the retaining bracket is provided with a stop which in the locking position bears against the inside of a scraper wing, and
wherein the stop is offset relative to a plane spanned by the retaining cams and adjoins one of the retaining cams.

16. The scraper of claim 1, wherein the at least one retaining bracket includes a bracket body,
wherein the insert recess is formed underneath the head web,
wherein the grooves open toward the underneath side of the scraper bridge on each side of the insert recess for supporting the retaining bracket with positive locking engagement, and
wherein the bracket body is provided integral with at least two retaining cams spaced from one another for engaging under-cut sections in the grooves of the scraper bridge.

17. The scraper of claim 16, wherein the retaining bracket has a T-shaped cross-section in the area of each of the at least two retaining cams, and the at least two retaining cams are formed at opposite ends of the bracket body.

18. The scraper of claim 16, wherein the at least two retaining cams protrude from each end side of the bracket body and are provided at both end sides of the bracket body between the at least two retaining cams with protruding curved bearing noses for bow ends of vertical chain links of a chain.

19. The scraper of claim 1, wherein the retaining bracket includes a bracket body, the bracket body being provided integral with at least two retaining cams spaced from one another for engaging under-cut sections in the grooves of the scraper bridge, and
wherein the retaining bracket has a T-shaped cross-section in the area of each of the at least two retaining cams and the at least two retaining cams are formed at opposite ends of the bracket body.

20. The scraper of claim 1, wherein the retaining bracket includes a bracket body, the bracket body being provided integral with at least two retaining cams spaced from one another for engaging under-cut sections in the grooves of the scraper bridge, and
wherein the at least two retaining cams protrude from each end side of the bracket body and are provided at both end sides of the bracket body between the at least two retaining cams with protruding curved bearing noses for bow ends of vertical chain links of a chain.

* * * * *